United States Patent [19]

Belrose

[11] Patent Number: 4,852,624

[45] Date of Patent: Aug. 1, 1989

[54] TIRE INFLATION DEVICE FOR EMERGENCIES

[76] Inventor: Frank R. Belrose, 2349 Dodd Rd., St. Paul, Minn. 55120

[21] Appl. No.: 97,673

[22] Filed: Sep. 17, 1987

[51] Int. Cl.$^4$ .............................................. B60C 23/00
[52] U.S. Cl. ................................... 152/415; 137/229; 141/38; 141/279; 141/382; 141/386; 251/149.7; 251/347; 251/348
[58] Field of Search ................. 152/415, 427; 141/38, 141/382, 383, 386, 279; 137/227, 229; 251/149.6, 149.7, 341, 347, 348

[56] References Cited

U.S. PATENT DOCUMENTS

| | | | |
|---|---|---|---|
| 1,487,831 | 3/1924 | Barber | 152/415 |
| 1,614,307 | 1/1927 | Kraft | 137/229 |
| 1,800,393 | 4/1931 | Leonard | 137/229 |
| 2,237,559 | 4/1941 | Jenne | 152/415 X |
| 2,663,348 | 12/1953 | Farris | 152/415 |
| 4,269,312 | 5/1981 | Bressler | 152/415 X |

Primary Examiner—Robert A. Dawson
Assistant Examiner—Thomas Bokan
Attorney, Agent, or Firm—James V. Harmon

[57] ABSTRACT

A flat tire inflation device for emergencies is provided which includes a flexible hose, a supply chuck that is temporarily securable to a inflated tire by means of a spring loaded retaining clip and having a pressure gauge on the inflation chuck at the other end of the tube. An extension projects from the inflation chuck for connecting the inflation chuck to recessed valve stems.

4 Claims, 1 Drawing Sheet

TIRE INFLATION DEVICE FOR EMERGENCIES

Emergency inflation devices have been previously proposed for scavenging air from an inflated tire or spare tire. These devices, however, have been inconvenient, difficult to manipulate and have not been particularly well suited for drivers who have little mechanical aptitude or are not used to performing emergency service work on cars that are stranded with a flat tire. In view of these shortcomings, it is a major objective of the invention to provide an emergency inflation device which is simple, easy to use and reliable and can be operated easily by an inexperienced person. The present invention includes a provision for automatically locking the inlet chuck to an inflated tire, for easily filling all tires even those with recessed stems which are inaccessible and for then informing the user when a sufficient amount of air has been transferred to the flat tire.

THE FIGURES

DETAILED DESCRIPTION OF THE INVENTION

Figure 1:
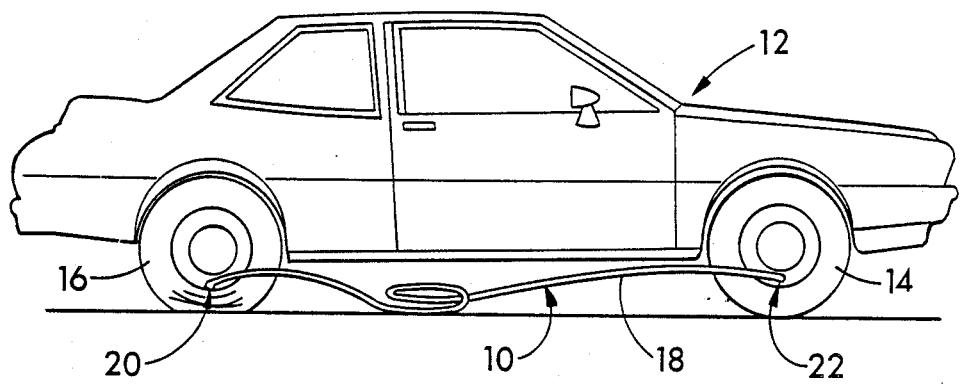
FIG. 1 is a side elevational view of an automobile with the present invention in use.

As shown in FIG. 1, the device of the present invention indicated generally by the numeral 10 is used for transferring air in an emergency for inflating a flat tire of a vehicle such as an ordinary passenger automobile 12. This is accomplished by transferring air from a good tire 14 to a flat tire 16 through the transparent plastic hose 18 which is connected to the inflated tire 14 by means of an inlet or supply chuck 22 to a manually held inflation chuck or outlet chuck 20 which during operation is held on the tire stem of the flat tire 16 by hand.

Figure 2:
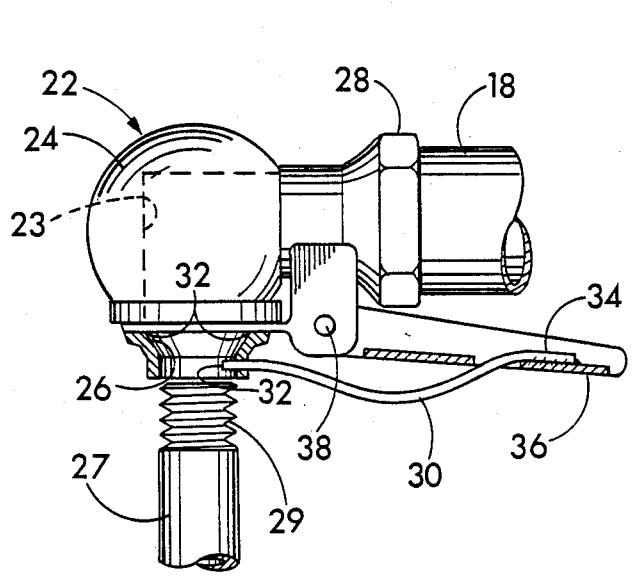
FIG. 2 is a side view of the air inlet chuck in one end of the hose.

The inlet or supply chuck 22 will now be described by reference to FIG. 2. As shown in the figure, the air supply chuck 22 includes a chuck body 24 having an air passageway 26 connected via coupling 28 to the hose 18. The inlet opening 26 of the chuck 22 is adapted to fit over the stem 27 of an inflated tire. The stem 27 is threaded at 29. Fitted over the end of the inlet chuck 22 is a retaining or locking clip 30 in the form of a thin strip of spring steel having a tire stem locking point 32. The spring steel strip 30 extends toward the right in the figure and has a free end 34 positioned in contact with a control lever 36 adapted to pivot about a pin 38 on the body 24 of the supply chuck 22 so that as the lever is pivoted in a clockwise direction, the retaining clip 30 will slide slightly toward the left, locking the stem 27 in place. However, when the lever 36 is pressed in a counter-clockwise direction against the pressure of the spring, the point 32 will slide toward the right thereby releasing the locked threads 29 on the stem 27. In other words, the retaining clip 30 can be used to quickly and easily lock the chuck 22 onto the stem 27 of the inflated tire while the uninflated tire is being filled. When the chuck is to be removed, lever 36 is pivoted upwardly in the figures, releasing the clip 30 from the threads 29 of the stem 27.

Figure 3:
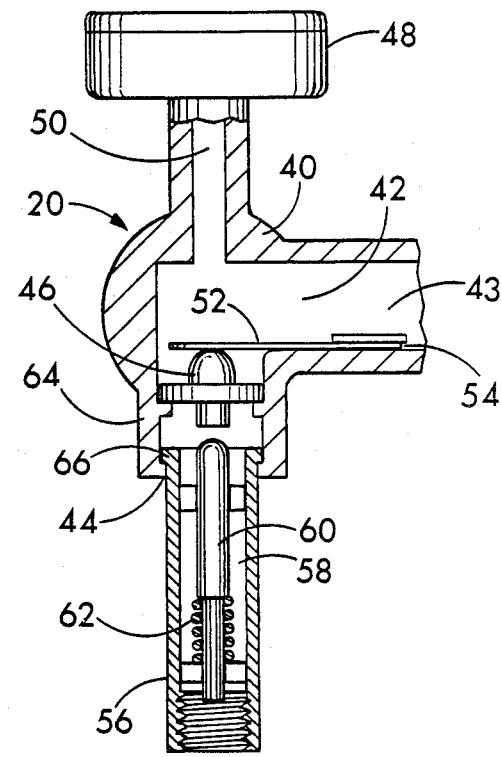
FIG. 3 is a vertical sectional view of the air outlet chuck.
Figure 4:
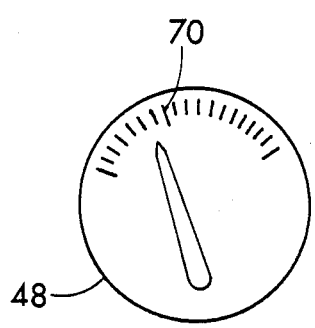
FIG. 4 is a plan view of the gauge shown in FIG. 3.

Refer now to FIGS. 3 and 4 which illustrate the manually held outlet chuck 20. As shown in the figures the outlet chuck 20 includes a chuck body 40 having an interior passage 42 communicating with the air supply hose 18 at 43 with an outlet port 44 through spring loaded check valve 46 and a pressure gauge 48 through a duct 50. The check valve 46 is normally biased in a downward direction by means of a leaf spring 52 secured in place by having side edges held in a retaining slot 54. A tubular outlet extender 56 extends from the chuck 20 to the stem of the tire that is to be inflated. The extender which can be made of plastic includes a cylindrical body having a central passage 58 extending therethrough, at the center of which is slidably mounted a valve operating pin 60 yieldably biased in an upward direction by means of a helical spring 62. The extender 56 can be loosely fitted into a socket 64 so that the pin 60 strikes valve 46 when the extender is forced upwardly in the socket 64. If desired, nibs 66 can be provided on the upper end of the extender 56 so that the extender can be snap-fitted into the socket 64 to hold it temporarily or permanently in place within the socket 64 of the chuck 20. During use, the extender 56 is placed over the stem to be filled and screw threaded thereon until the pin 60 makes contact with the valve pin of the tire (not shown). The chuck 20 is then pressed radially outwardly or downwardly until the upper end of pin 60 strikes the lower end of the valve member 46 at which point air will be transferred through the extender into the tire. At the same time the air pressure will be indicated on the gauge 48. A special mark 70 can be placed on the gauge 48 to indicate the minimum pressure required to drive on the tire, e.g., 15 or 20 pounds.

Thus the invention provides a quick and easy device for reinflating a flat tire by transferring, say, 6 to 8 pounds of air from each of several tires to the flat tire and repeating this procedure with each successive tire. If desired, air can be taken from the tire of another vehicle. This enables the user to drive to the nearest gas station where all four tires can be refilled. The device can be stored in the trunk, requires no tools and is easy for inexperienced users to operate. The lock-on device enables the user to quickly and easily connect the supply chuck temporarily to the filled tire while air is being transferred to the flat tire and the device allows the user to see how much air has been transferred from each successive tire with a special indicator mark provided to allow the user to know when sufficient air has been transferred. It also enables the user to easily inflate tires having stems which are hidden or inaccessible.

The invention can also be used with a can of compressed sealant used to seal leaks in a tire and is particularly useful when the pressure in such a can is inadequate for inflating the tire. The transparent plastic hose allows the device to be stored in a minimum of space and enables the user to make sure no vapor or debris has accumulated in the hose during storage.

What is claimed is:

1. An emergency transfer apparatus for filling flat tires comprising, a flexible air transfer hose having an air inlet chuck at one end of the hose, said air inlet chuck having a manually releasable retaining clip thereon for automatically locking and temporarily retaining the inlet chuck on a stem of an inflated tire, manually operable means connected to the retaining clip for releasing the clip when the inlet chuck is to be removed from the tire stem, an inflation chuck at the opposite end of the hose, a movable check valve element in the inflation chuck allowing the hose to hold air pressure supplied by the inflated tire when the inlet chuck is connected thereto, a rotatable extension tube rotatably connected to said inflation chuck and projecting from the inflation chuck, said extension tube having a passage therethrough, and operating pin slidably mounted within the extension tube, said pin being adapted to extend from the check valve element in the inflation chuck to a tire stem for operating a tire valve within the tire stem when manual pressure is applied radially outwardly to the inflation chuck, said extension is provided with internal screw threads for threading the extension onto a tire stem whereby the extension can be screw-threaded onto the tire stem while the inflation chuck remains stationary, whereby said manual pressure will force the pin toward the tire valve to open the tire valve and at the same time will open said movable check valve element in the inflation chuck to permit air to be transferred through the device into the flat tire.

2. The device of claim 1 wherein said inflation chuck has an air gauge operatively associated therewith to indicate the air pressure of the tire that is being inflated so that the air gauge can be seen when the inflation chuck is applied manually to the flat tire.

3. The emergency transfer apparatus of claim 1 wherein the extension tube has a connected end and a free end and the connected end is mounted rotatably within a socket in the inflation chuck, outwardly projecting nibs are provided on the connected end of the extension tube within the socket so that the extension tube can be snap-fitted into the socket to hold it temporarily or permanently in place within the socket of the inflation chuck.

4. The emergency transfer device of claim 1 wherein a spring is mounted in the extension tube to yieldably bias the operating pin toward the valve element in the inflation chuck.

* * * * *